C. M. RISLEY.
Securing Linchpin.
No 49,651. Patented Aug. 29, 1865.
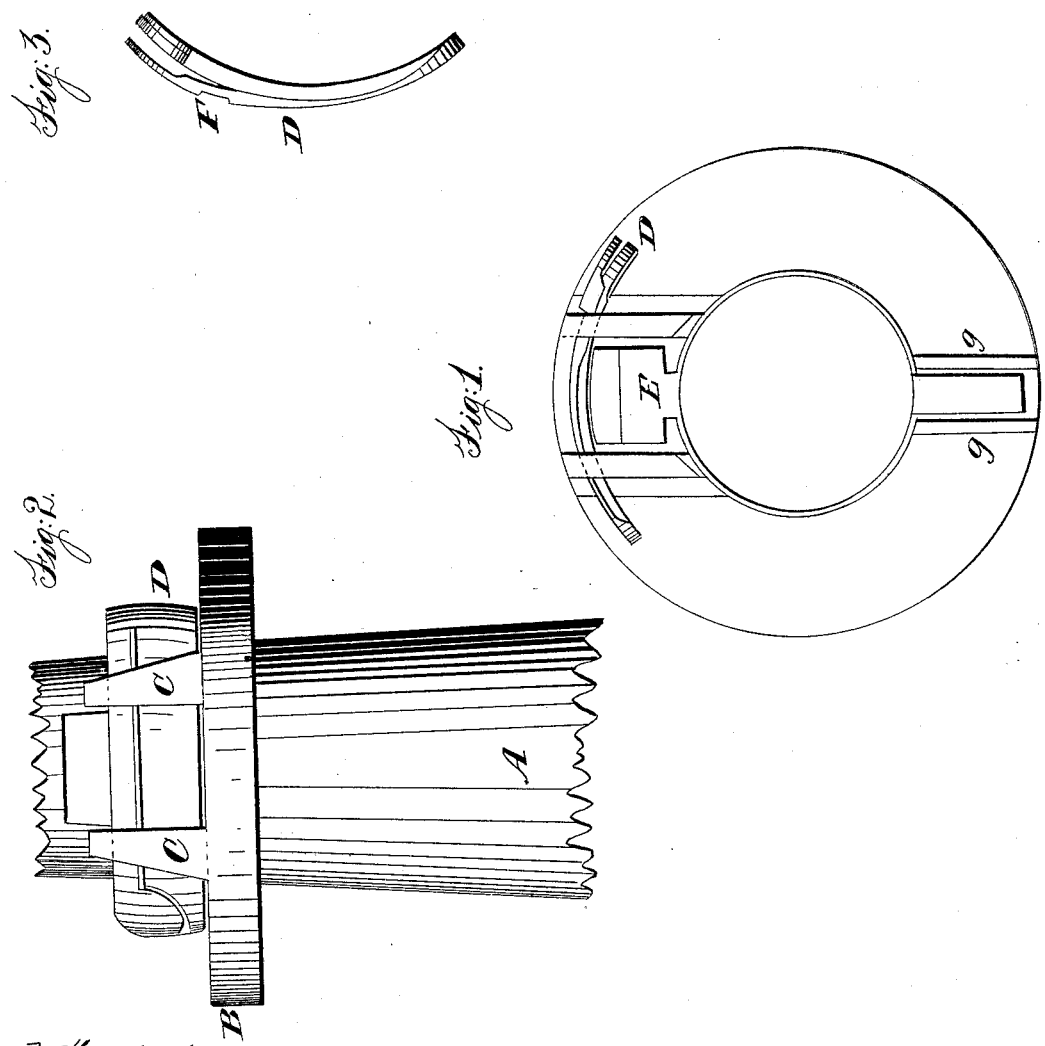
Witnesses
H L Johnson
Henry Bradshaw
Inventor
Cabel M. Risley

UNITED STATES PATENT OFFICE.

CALEB M. RISLEY, OF WOODBURY, NEW JERSEY.

IMPROVEMENT IN SECURING LINCHPINS.

Specification forming part of Letters Patent No. 49,651, dated August 29, 1865.

*To all whom it may concern:*

Be it known that I, CALEB M. RISLEY, of Woodbury, in the county of Gloucester, in the State of New Jersey, have invented a new and Improved Method of Securing Linchpins in their Places; and I do hereby declare that the following is a full and exact description thereof, reference being had to the accompanying drawings, and to the letters of reference marked thereon.

A is the axle; B, washer against which the wheel rubs; C C, Figures 1 and 2, ears with slot, (designated in dotted lines,) through which the sliding spring passes, and is there fastened by the catch F to secure linchpin in its place; D, curved key with spring, Fig. 3; E, linchpin; F, catch on the sliding spring to keep the key in its position; G G, bottom ears inclosing the lower end of the linchpin to prevent the washer from turning on the axle.

What I claim as my invention, and desire to secure by Letters Patent, is—

The washer, in combination with the sliding spring and slotted ears C C, all constructed and arranged as described, substantially as and for the purpose set forth.

CALEB M. RISLEY.

Witnesses:
HENRY BRADSHAW,
H. L. JOHNSON.